United States Patent

Baumann

[15] 3,675,203

[45] July 4, 1972

[54] AUTOMATIC PATTERN RECOGNITION WITH WEIGHTED AREA SCANNING

[72] Inventor: Dwight M. B. Baumann, 39 Amherst Road, Belmont, Mass. 02178

[22] Filed: April 9, 1969

[21] Appl. No.: 852,953

Related U.S. Application Data

[63] Continuation of Ser. No. 480,242, Aug. 5, 1965, abandoned, which is a continuation of Ser. No. 149,833, Nov. 11, 1961, abandoned.

[52] U.S. Cl. ....340/146.3 AQ, 340/146.3 G

[51] Int. Cl. ....G06k 9/12

[58] Field of Search ....340/146.3, 147 J; 235/61.115

[56] References Cited

UNITED STATES PATENTS

| | | | |
|---|---|---|---|
| 897,662 | 9/1908 | Roberts | 340/147 T |
| 2,424,243 | 7/1947 | Lowell | 340/147 T |
| 2,689,686 | 9/1954 | Tholstrup | 340/147 T |
| 3,151,855 | 11/1964 | Rabinow | 340/146.3 |
| 3,182,290 | 5/1965 | Rabinow | 340/146.3 |
| 2,663,758 | 12/1953 | Shepard | 340/146.3 R |
| 3,074,050 | 1/1963 | Shultz | 340/146.3 AQ |
| 2,063,481 | 12/1936 | Bryce | 235/61.115 CR |
| 2,964,734 | 12/1960 | West | 340/146.3 Z |
| 2,682,043 | 6/1954 | Fitch | 235/61.115 CR |
| 3,033,449 | 5/1962 | Quinn et al | 340/146.3 Z |
| 295,224 | 5/1943 | Maul | 235/61.115 CR |
| 3,108,254 | 10/1963 | Dimond | 340/146.3 Z |
| 2,000,403 | 5/1935 | Maul | 340/146.3 Z |

OTHER PUBLICATIONS

S. H. Unger, " Pattern Detection and Recognition," May 9, 1959, Proceedings of the IRE, pp. 1737 to 1751.

*Primary Examiner*—Maynard R. Wilbur
*Assistant Examiner*—William W. Cochran
*Attorney*—Rines and Rines

[57] ABSTRACT

The apparatus scans a series of weighted masks to trigger a threshold circuit to produce an output signal when the particular character being compared exceeds a certain level of similarity to the mask. The occurrence of output signals indicates the membership of the pattern in a particular subset, portion, etc. The masks are selected in accordance with the frequency of occurrance of the black portions of the font of characters in the set being considered.

28 Claims, 7 Drawing Figures

INVENTOR

INVENTOR
Dan W. M. Baumann

INVENTOR

INVENTOR

AUTOMATIC PATTERN RECOGNITION WITH WEIGHTED AREA SCANNING

This case is a continuation of application Ser. No. 480,242 filed Aug. 5, 1965, now abandoned, which was a continuation of application Ser. No. 149,833 filed Nov. 11, 1961, now abandoned.

This invention relates to the automatic "reading" of the printed word. Automatic reading here refers to the mechanized recognition of patterns or images and a subsequent output that uniquely describes the images being read.

The principal object of this invention is to scan a printed page by mechanical, electrical, or optical means and to cause the printed intelligence to be coded into a form that can be processed by automatic data processing machines or stored on a digital memory medium such as magnetic tape or punched-paper tape.

A further object of the invention is to provide a method of utilizing automatic means to devise a specialized scheme for each different alphabet or each style of print.

A further object is to provide an apparatus that can distinguish between any predescribable set of patterns. For example, this apparatus may be used to sort variously shaped parts on a moving conveyor belt or to locate various patterns on a map or photograph.

An important feature of the invention is the ability to recognize a pattern or character without prior knowledge of the position of the pattern or character. This is especially important if the device is to be used with print that has been justified to produce uniform margins.

Any person skilled in the art will find many similar applications of the described devices such as detecting, sorting, separating, or locating patterns or images by automatic means. The patterns or images include but are not limited to those defined by transmitted or reflected light, sound, heat, and magnetic or electric fields.

The prior art reveals several schemes whereby characters might be recognized by matching them with masks that resemble the characters with a one-to-one correspondence. Other schemes carry out a process similar to mask comparison by scanning the characters with one or more photodetectors, or in some cases with magnetic heads. In the later schemes the outputs of the detectors are compared with an internally stored computer program.

It has been determined, however, that improved results can be obtained that will overcome some of the serious limitations of the prior art. The direct comparison techniques of the one-to-one masks in the prior art do not allow for sufficient discrimination between characters. An upper case C and an upper case G, in most fonts, differ only in an area that is a small percentage of the entire character. Another difficulty arises because some characters such as an upper case O will fill the entire mask of the upper case C. Since the ordinary mask techniques depend on a simple comparison of areas, a small imperfection can cause misrecognition. Similar difficulties exist in attempting to recognize other patterns.

The computerized methods of the prior art have some of the same basic short comings as the comparisons with a one-to-one mask. In some instances some of the shortcomings have been overcome by making specialized compensations in the recognition logic. The computerized schemes in the prior art suffer primarily from inflexibility. Aside from requiring very complex circuitry, they are usually limited to a very specific, specially designed font. The special fonts are designed to increase the discrimination and decrease the amount of logical manipulations required within the computer.

As a result of extensive tests and simulations of various character recognition schemes by use of a large digital computer, a new method of character recognition has been discovered. This method differs from the one-to-one masks and the computerized masking schemes in the following important ways.

1. The areas that display the maximum differences are given higher priority in considerations concerned with separating a set of characters into two or more subsets.

2. The method is entirely general and can be applied to any set of patterns whose members are described uniquely.

3. The method lends itself to computerized design of the masks. Therefore, the masks may easily be specialized for maximum efficiency for each particular set of characters.

4. The method does not require prior knowledge of the possible location of a character.

Other differences from the prior art will be evident from the detailed description that follows hereinafter. Further objects of the invention and advantages over the prior art will be pointed out in the appended claims.

In the drawings:

FIG. 1 is a perspective view of an optical scanning system that successively scans the image of a series of characters past an array of masked photodetectors.

FIG. 2 describes the logical tree structure of the decision processes that describe the coded output of the character recognition machine.

FIG. 3 shows a sample of 10 characters to show how the characters are described by a matrix of spots.

FIG. 4 demonstrates the alphabet surface that describes the number of times each square is utilized in defining the sample set of characters.

FIG. 5 demonstrates some of the possible masks that can be formed from the alphabet surfaces of FIG. 4.

As has been indicated before, the device can be used for recognition of any types of patterns. For the purposes of illustration the figures show the very important function of automatic reading or coding a printed page. A mechanical scanning system with an opaque projection system is depicted for simplicity of illustration. A person skilled in the art can easily adapt other standard scanning schemes that will also cause an image to be moved across an array of masked photodetectors. For example, a closed circuit television system could be used if the synchronizing circuits were modified to allow the picture to "roll" at a controlled rate. Another possible scanning system might involve a rotating mirror system whereby successive mirror faces flash the image past the photodetectors. Any other methods that could cause the patterns or the photodetectors or both to move relative to each other can be used. Certainly this would also include methods of shifting the masks past the characters within the memory elements of a digital computer.

Figure 1:
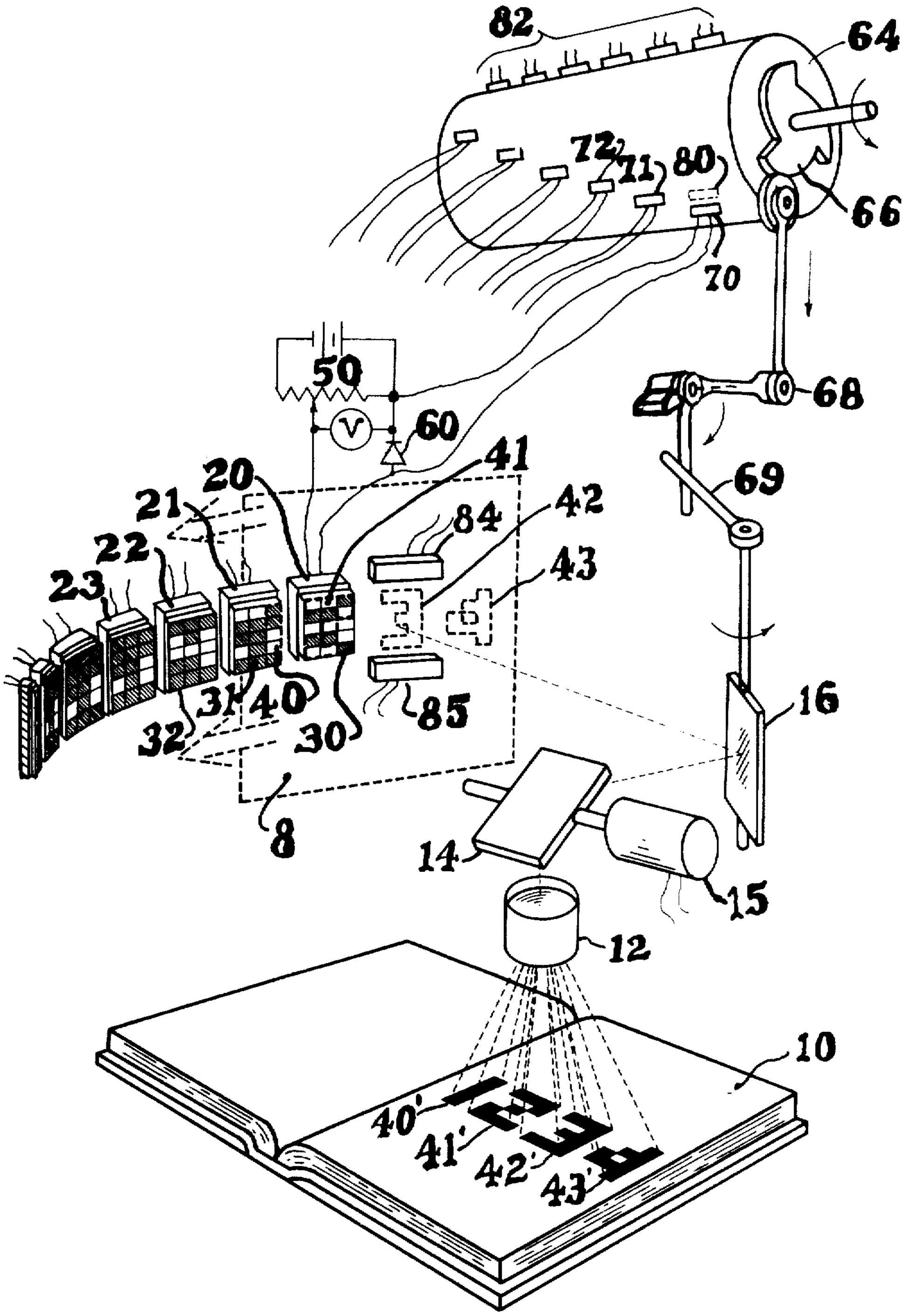

FIG. 1 shows a simplified device that can be used for sweeping the image 8 of a printed page 10 past an array of photoelectric transducers 20,21,22, . . . . The image 8 of the printed page 10 is formed by the lens 12 and projected toward the area of the phototransducers 20,21,22, . . . . If the mirrors 14 or 16 are moved or oscillated, the image will be moved relative to the phototransducers 20,21,22 . . . . Each phototransducer is covered with a suitable mask 30,31,32, . . . . The opaque and transparent areas of the masks determine the weighting that is ascribed to each corresponding area of the characters being read. The masks cause certain portions of each phototransducer to be more or less effective than other portions of the same transducer. While the image of one character 40 is superimposed on one of the masked phototransducers 21 & 31, an adjacent character 41 may be projected on another masked transducer 20 & 30. Notice that images 42 & 43 are advancing toward the array of masks because of the movement of the mirror 16 actuated by the cam 66. As the scanning process continues, each character is in turn projected on each transducer.

A variation of this device would be to place a beam splitter in the path of the light in such a manner as to divide the light into a multiplicity of images. With this variation, each character can be projected simultaneously on several or all of the multiplicity of phototransducers. In this case the array of transducers would be stacked in an axial direction, perpendicular to the array shown in FIG. 1. An alternative would be to arrange the transducers in a rectangular array corresponding to a combination of axial and circumferential placement of the masks.

The output of each transducer is connected to the level detector 50,51,52 . . . . In its simplest form the level detector is a diode 60 that has been biased by some predetermined voltage V in such a way that the diode will only conduct when a certain lower threshold voltage has been attained by the corresponding transducer 20. Each other transducer is connected to a similar level detector, not shown. As will be clarified later, in some cases a multiplicity of level detectors, each adjusted to a different bias value, will be connected to each transducer.

As the image of each character passes onto each particular masked transducer, the voltage output from the photocell will drop as the relationship of the area of the character corresponds to the transparent area of the mask. The smallest output from the phototransducer will occur at the exact time that the largest area of the character corresponds to the predominant portion of the clear area of the mask. Thus the position of a character along the scanning line can be related to the time at which the phototransducer output becomes a minimum. This ability to locate the position of a character without a priori positional information is very important for the reading of a printed page. Locating a line of printed characters can be accomplished by a low resolution scanning of a page to detect the relative densities caused by a predominance of characters along a straight line. Most of the schemes of the prior art assume tacitly that the character has been located and resides within a certain field. Devices for locating these fields are then usually based on the assumption that the first character of a line can be located and that the following characters are uniformly spaced. While uniform spacing is a reality in some forms of typewritten and specially printed data, the predominance of printed material is justified to create uniform right-hand and left-hand margins. Certain characters in most printed pages are of different widths. Furthermore, characters sometimes run together making it difficult to differentiate single characters from the combination.

This invention overcomes the difficulties discussed above by continuously scanning along a line and causing a character to be recognized and located by the same mask-to-character-matching process. This matching requires that each character be scanned past all of the masks or at least all of the masks required to recognize the particular character. In contrast to prior art devices by which the masks are scanned past each character, the reading speed of this invention is not limited by the number of masks that must be scanned past each point.

In order to locate each character uniquely at least one masked phototransducer must give a well-defined, unambiguous null to represent the location. This places some restriction on the type of masks that can be constructed. This restriction must be accounted for in the mask design. If at least one null exists for each character, its presence can be used to indicate which portions of the outputs from the other phototransducers can be considered in the recognition. These restrictions will be explained further in the discussion of mask production techniques. Suffice it to say, that if no transducer output has dropped below the preset threshold, the presence of a character will not be distinguished from a blank space.

The output of each level detector is amplified and clipped to a standard voltage by means of amplifier 62 and is recorded on the magnetic drum 64 by means of the magnetic heads 70,71,72 . . . . The drum 64 is rotated in timed sequence with the translation of the moving mirror 16. A simplified method of relating the motion of the drum to the motion of the mirror 16 is shown as a cam 66 and follower 68 connected to lever 69. Each recording head 70,71,72 . . . is staggered with respect to the direction of rotation of the drum. In this manner the information 80 recorded onto the first track of the drum by the head 70 has rotated far enough to be alongside of the recording head 71 on track two by the time the character has advanced from photodetector 20 to photodetector 21. Similarly information is added to an axial row along the drum 64 to correspond to each of the outputs from the biased diodes and in direct relationship to the scanning of an image past the array of photodetectors. After the last photodetector has been traversed past a particular character, all of the results of the photodetector and diode combinations will be recorded along a single axial line. The information for each character will occupy a different axial line depending only on the relative spacing of the characters on the page of the book and on the relative speed of the magnetic drum as related to the movement of the mirror.

Since each recognized character 40,41, or 42, etc. is represented by an axial line of recorded information on the magnetic drum 64 an axial row 82 of readout heads can be utilized to present a coded signal corresponding to the recognized character. Because the signals from the biased diodes were amplified and clipped to a standard level, the output from the readout heads will produce a signal for each masked photodetector whose output was lower than the required threshold. Therefore, each output from the magnetic readout heads is a binary equivalent of the character or pattern that has been scanned. With proper mask design this binary equivalent will be a unique code for each character or pattern of the set that is being considered.

In the configuration shown in FIG. 1 an orthogonal set of scanning mirrors is shown. Mirror 16 is controlled in timed relationship to the drum by the cam 66 and follower 68. This mirror 16 causes the device to scan a line of print across the masks. Each mask will indicate the presence of particular characters by having sufficient portions of the projected character fall on the clear areas of the mask in such a way that the darkened image of the character further reduces the output current from the photocell. With the arrangement shown, the diode will have a voltage across it at only the exact time when sufficient blocking of the light occurs. Therefore, the position of the character along the line of print is exactly identified by the time at which a voltage appears across a diode. The system thus is not dependent on the spacing of the characters along the line.

The vertical scanning system consisting of the mirror 14 controlled by the servo motor 15 could also be operated in such a manner that the position of a line would be located when a voltage appeared across selected diodes. In a practical situation, however, searching for the position of a line of characters can be aided by means of the long, narrow photodetectors 84 and 85 that are located above and below the masked photodetectors. If some of the area of the photodetectors is intercepted by characters, appropriate signals can be generated to cause the servo actuator 15 to raise or lower the line, as the case may be, in order to center it on the array of masked transducers 30,31,32, . . . and 20, 21,22, . . . .

Extra photodetectors or a preliminary scanning system could be added to the device to aid in locating the next line of characters to be scanned. Such a refinement would speed up the reading process by aiding in locating the beginning lines of a page, finding short lines or interrupted lines near an illustration or equation, etc.

Figure 2:
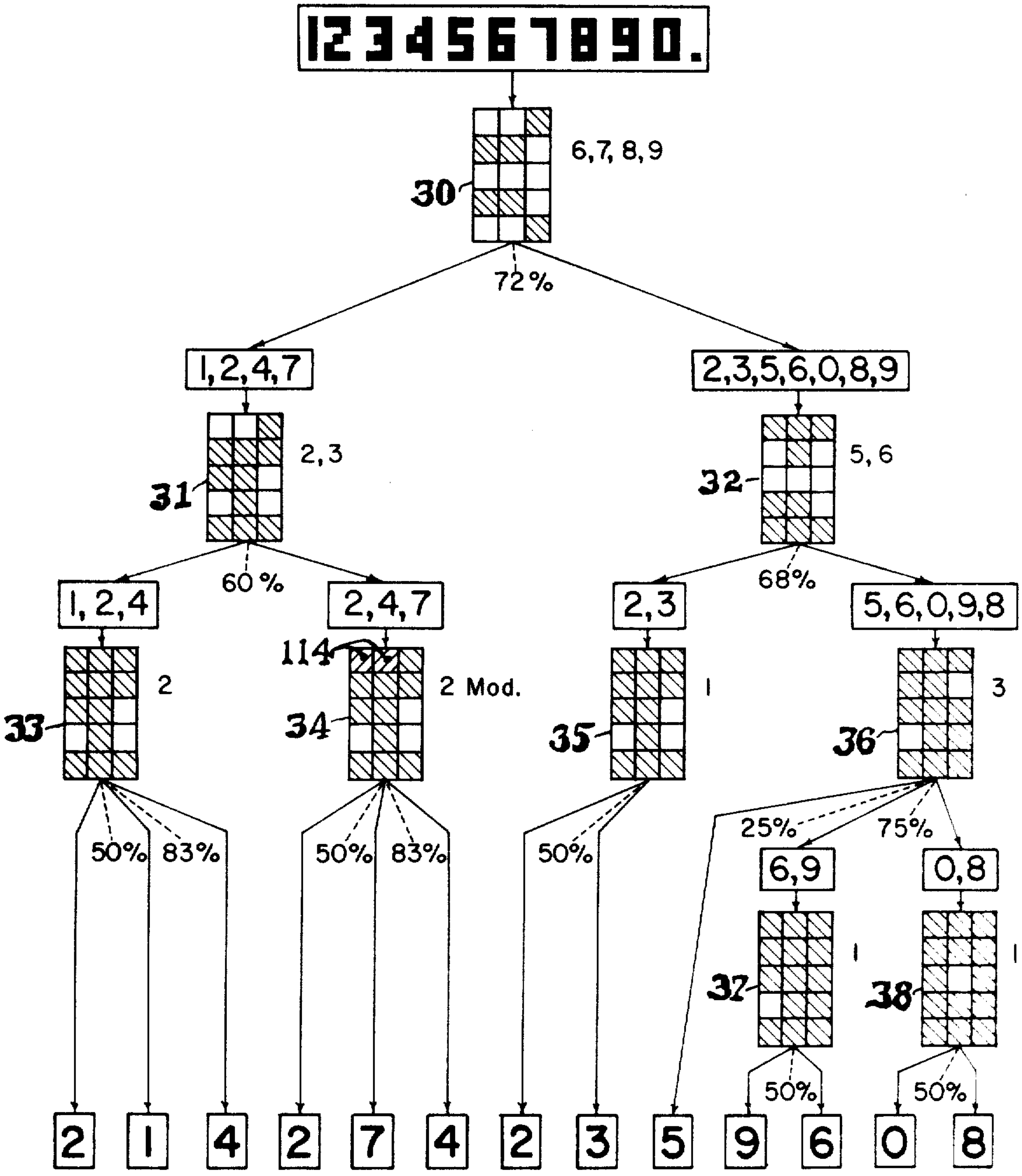
Figure 3:
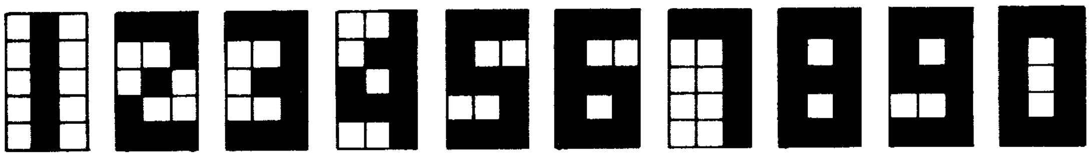

FIG. 2 demonstrates the logical tree structure of the character recognition process. If the set of characters described in FIG. 3 is scanned across the mask, the characters "1,4,7,2" will be considered to be less similar and the characters "2,3,5,6,0,8,9" will be considered to be more similar to the first mask 30. The threshold for which the biased diode conducts for this particular case with this particular set of characters is approximately 72 percent, where the percentage term is used to define the similarity in terms of one minus the normalized photocell output. For example, the character "8" would cover all of the clear areas of the mask and therefore the photocell output would be zero, and the similarity would be 100 percent. The character "1" on the other hand would cover a minimum of three of the nine transparent areas of the mask and therefore have a similarity of 33 percent.

This threshold relationship of the discrimination is a direct consequence of the signal level detecting technique used for separating a set of characters into subsets. A more important aspect of this level detection scheme is the fact that the discrimination level can be considered to be a band rather than a single sharply defined level. In the example shown in FIG. 2 the tolerance band of the discrimination level was considered to be ±15 percent. This means that any similarly exceeding 87 percent would be automatically considered to be in the upper subset "2,3,5,6,0,8,9," whereas any similarity less than 57 percent would be automatically considered to be in the lower subset "1,4,7,2." Any similarity between 57 percent and 87 percent would therefore be considered in both of the subsets during the second stage of the recognition process. This allows a letter to be deformed or translated by an amount equal to ±15 percent of the mask area without being misrecognized.

In this case the character "2" exhibits a similarity of 66 percent and thus falls into the range where it may be recognized either as a member of the upper subset "2,3,5,6,0,8,9" or the lower subset "1,4,7,2" depending on whether a possible imperfection or misalignment causes it to be more or less similar than 72 percent.

This plus or minus tolerance band is one of the important variable parameters of this system. The band can be chosen to be large enough to minimize the number of errors in the character recognition scheme. Increasing the width of the tolerance band may cause an increase in the number of masks required. The number of masks would increase because more and more characters would overlap into both subsets and thus require more masks to separate them. In practice there would be a certain trading curve relating the accuracy required to the number of masks required. This trading curve would demonstrate the cost-penalty to accuracy relationship.

Notice that a branch to the right, on the tree structure of FIG. 2, corresponds to a voltage appearing across the diode 60 and therefore to a pulse being recorded on the magnetic drum by the magnetic head 70. An arrow to the left on the diagram corresponds to no voltage drop across the diode 60 and therefore no pulse is recorded on the drum. The separations can therefore be defined in terms of their binary equivalents. In other words, the upper subset, that is a separation to the right, corresponds to a binary "1." A lower subset corresponds to a separation to the left and is defined by a "0" binary input to the magnetic drum 64. One may therefore follow the logical tree diagram of FIG. 2 and determine what the binary equivalent of a particular character is. For example, the character "3" can be defined as a binary "101" because the first separation is to the right, the second to the left,and the third to the right.

A special situation is demonstrated by the separations of masks 33,34,& 36. In both these cases three possible separations can be made without overlapping the ± 15 percent tolerance band. For this particular demonstration alphabet the characters "1, 2, & 4" demonstrate a similarity to mask 33 of 33 percent, 66 percent and 100 percent respectively. Because each of these is separated by at least 30 percent, the characters can be unambiguously defined by two biased-diode level detectors set at 50 percent and 83 percent respectively. A similar situation results from the separations of masks 34 & 36.

In the situations where one mask separates characters into more than two subsets, a different track on the magnetic drum 64 can be used to record each decision. Some conservation of drum space can be obtained by combining tracks into a more optimum code. For example two tracks should be able to record four different possible combinations.

Another special situation is exhibited by the character "2". The "2" is found in several branches. This means that there is more than one legal binary equivalent for the "2." Any of these multiple equivalents may appear at the output 82 from the magnetic drum 64 when a "2" is read.

A further implication of the logical tree diagram of FIG. 2. is that whenever a decision is branched off to the right of to the left, all the decisions along the remaining branch can be ignored. For example if the decision at the mask 30 is a binary "1," corresponding to a right branch, all the decisions of masks 31, 33, and 34, can be ignored.

Thus far nothing has been said about the method for designing the mask shown in the logical tree structure. FIG. 3 demonstrates the first step of the operations of defining the required mask. The characters are quantized for a computer simulation by dividing up the area occupied by a character into squares. In this case the characters are superimposed upon a uniform 3 × 5 grid as is shown in FIG. 3. This allows the characters to be defined in terms of binary numbers where each digit refers to a particular square of the grid. The dimension of the grid is dictated primarily by the complexity of the set of characters. However, in practice it is useful to consider a grid size that corresponds to the binary word size of an available computer. For example, if a 36-bit word is available on a computer, the grid could for practicality be made equal to 36 × 36 squares. During the development of this invention a large pattern recognition machine was simulated on a full-scale digital computer. Masks were developed for a full 62-character alphabet consisting of upper and lower case letters and 10 numerals. In that simulation each character was divided into a 36 × 36 bit field for convenience of operation with the computer used.

For this demonstration of my invention, a simplified version has been used which utilizes a grid of 3 × 5 squares because with a small number of squares it is simple to manipulate the information by counting the squares. It should be reiterated that this 3 × 5 alphabet is an example to demonstrate the method of preparing masks for weighted area pattern recognition.

Figure 4:
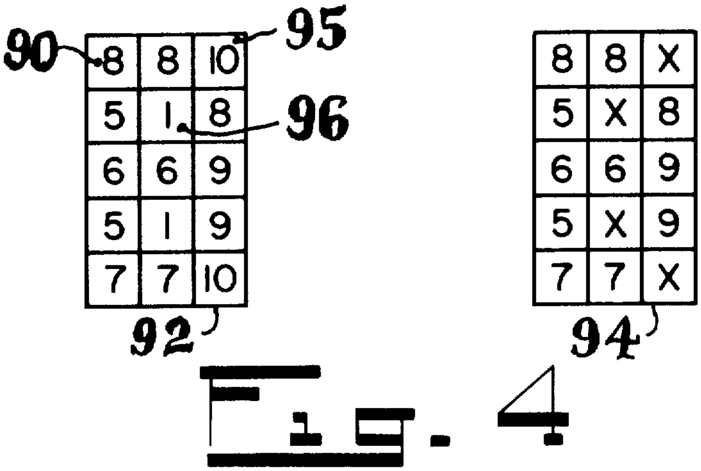

FIG. 4 demonstrates what has been defined as an alphabet surface. The number corresponding to each of the squares is simply the number of characters which have black portions corresponding to that particular square. For example, in the block alphabet shown in FIG. 3, eight of the characters have black spots in the upper left-hand corner 90.

Different alphabet surfaces can be defined depending on the rules used for orienting the characters that do not require an entire field. Notice that the character "1" of FIG. 3 uses only a portion of the width of the character field. This means that the character "1" may be aligned to the left edge of the field, the right edge of the field, or the center of the field. Each of these positions will give rise to a different alphabet surface and therefore to a different set of masks. In practice several different alphabet surfaces and masks may be defined and evaluated to find which presents a more efficient and error free set of masks.

The alphabet surfaces shown in FIG. 4 are right-hand alphabet surfaces. That is, all the characters have been aligned to the right-hand side of the field before the relative frequency of the black squares was counted. The right-hand alphabet surfaces are used throughout this presentation.

Two kinds of right-hand alphabet surfaces are defined. The first 92 relates the number of characters that have a black spot corresponding to each square. The second alphabet surface 94 has some of these squares eliminated. The eliminated squares are designated by an *x*. Notice that the eliminated squares correspond to areas whose relative frequency of characters was either high or low. The purpose of this elimination is to disregard the areas which contain very low information. For example, if one were to look at the upper right hand corner 95 of an area containing a character, one would find that all 10 characters had information in that square. Therefore, one would not learn any important fact from looking at that particular square. Likewise, if one would examine the square corresponding to the second row and second column 96, one would find only one character that had a black portion in that area and this would also correspond to a rather low amount of information. Admittedly, the square on the second column, second row 96 would give much information about the character "4," but it gives very little information that is useful for dividing the alphabet into subsets. The second alphabet surface 94 is therefore defined as an alphabet surface with the areas of "Low Information Removed."

Individual masks for the first separation are defined from the alphabet surfaces of FIG. 4. The masks are defined by designating areas whose relative frequencies of occurrence fall between a certain range of clear areas. Areas whose relative frequencies fall outside the chosen range are defined as opaque areas.

Figure 5:
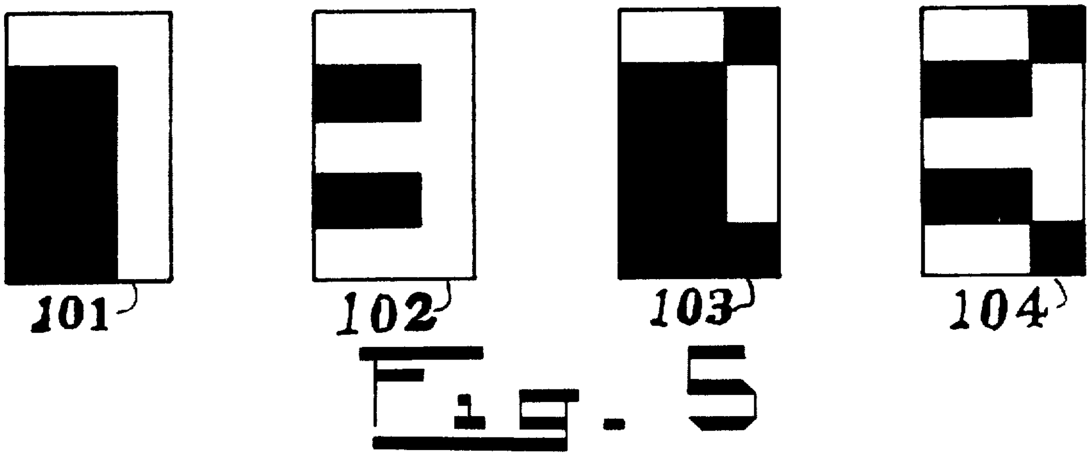

Mask 101 of FIG. 5 was developed by defining all of the areas of FIG. 4 that showed a relative frequency greater than 7 out of 10 as transparent areas. The use of such a mask dictates that all the characters that are similar to this particular kind of average character will be separated into a right subset and all the characters that are sufficiently different from the average will be separated into a left subset. Mask 102 defines clear areas as all those squares where relative frequency of occurrence is greater than 5 out of 10.

Masks 103 and 104 define different kinds of masks based on the alphabet surface with low information areas removed. Both masks 103 and 104 are defined from alphabet surfaces like 94 of FIG. 4 except that even more of the low information is removed. Mask 103 is defined by all the areas whose relative frequency of occurrence is 8 or 9 out of 10. Mask 104 is defined by all the areas whose relative frequencies are 6, 7, 8, or 9 out of 10.

Four different masks have been defined in FIG. 5 from the alphabet surfaces of FIG. 4. Several more masks can be defined for this first separation alone. Finding the optimum mask for any particular separation can be accomplished by a modified trial and error process. A mask can be chosen from the top of the range of relative frequency variables and compared to a mask from the bottom of the range. Then a mask from a central range can be evaluated. A mask in a range between the best two previously evaluated masks can then be chosen. This procedure is then followed until an optimum mask is located. The process of locating the optimum mask can be performed quite rapidly by use of a computer. Each set of patterns or characters is only processed once by the computer and thereafter the recognition is accomplished by a special purpose device; therefore, it is economically feasible to spend a fair amount of time and effort on optimization of the masks.

A practitioner skilled in the art of computer program development will find many short cuts in evaluating and defining proper weighted-area pattern recognition masks. Methods for evaluating the efficiency of a mask are also subject to individual modification to suit the whim of the practitioner developing the computer program to be used for the evaluation.

Figure 6:
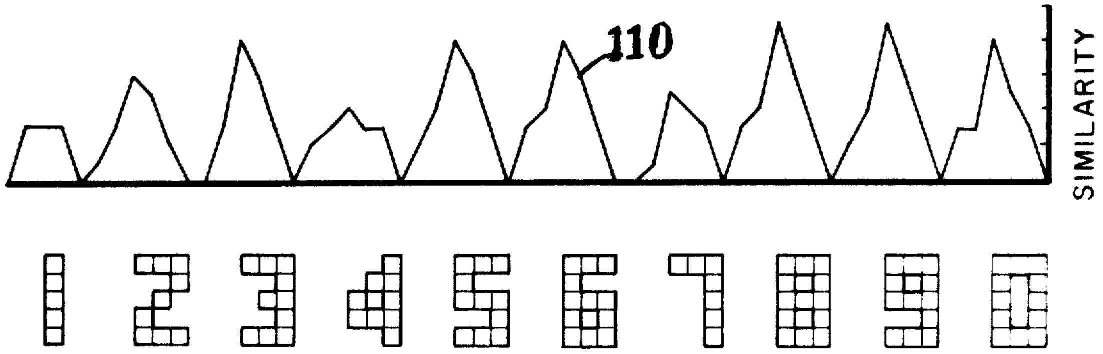
FIG. 6 shows a typical output from a masked transducer.

A most valid method of evaluating a mask is to scan each letter of the set of patterns past the mask and to record the similarity of each of the patterns as compared to each mask. An example of the results of such a procedure is shown in FIG. 6. The curve 110 of FIG. 6 is a plot of the number of squares that compare mask 104 to the 10 members of the special 3 × 5 alphabet. A conceptual method for forming the plot 110 is to consider the mask 104 to be moved across the characters. At each recorded increment the number of black squares that can be seen through the mask are counted and plotted as a function of the movement of the mask.

In a computerized mask design procedure the development of a curve like 110 of FIG. 6 can be accomplished by logically "anding" the binary words that correspond to the mask. The plot of FIG. 6 illustrates the number of successful logical "ands" plotted as a function of displacement of the mask past the stored characters.

An important result of the plot 110 of FIG. 6 is the distribution of amplitudes of the similarity plot. This distribution is plotted in FIG. 7 to relate the number of characters at each similarity to the similarity.

Figure 7:
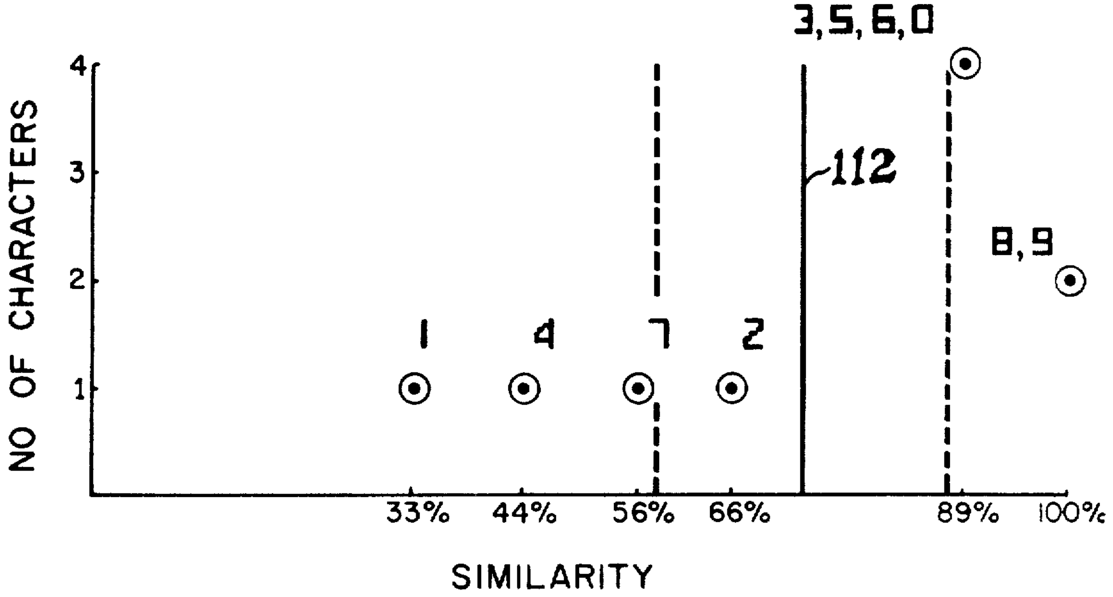
FIG. 7 shows a plot depicting the effectiveness of a particular mask.

One of the requirements for defining the threshold at which the separation is to occur is to locate the threshold in some position where there will be the least number of characters or patterns within the discrimination band. In FIG. 7 the widest spacing between points extends from 66 to 89 percent. This region is not wide enough, however, to accommodate a discrimination band of ±15 percent. Therefore, the "2" is considered to be within the band. The separation or threshold level 112 is then chosen at the average of 56 percent and 89 percent, or 72 percent.

Other requirements for choosing the threshold level are that as many characters as possible be on the right side of the separation. This is desirable because all characters on the right of the threshold can be located accurately by the existence of a recorded "1" on the drum 64. The threshold level is also limited from being placed too far to the left. The left limit is specified by characters that may not have distinct peaks in their scanning plot. See FIG. 6. Any characters with a multiple peak on its scanning plot or any combination of characters whose combined width is small enough to fall within the area of a single character field must be investigated to determine what the maximum extraneous similarity is. This maximum is then the lower bound on the discrimination threshold.

All of these determinations can be carried out by hand or by use of a suitably programmed digital computer. For any image that can be formed optically another method of finding the optimum masks can be used. If each character can be photographed and developed so that its image is a suitable grade of grey, then the transparencies of each of the characters can be stacked up and viewed to give an indication of the relative frequency of any portion of the area by the density of the combined transparency. Masks can then be chosen corresponding to a certain range of densities. Each of these masks can be evaluated to find the optimum mask.

The weighted area masking technique of pattern recognition can be applied to recognition of any form of pattern that is definable by radiant energy that can be masked and whose net energy transmitted through the mask can be measured.

The methods of pattern development discussed relative to FIGS.3, 4, 5, 6, and 7 have pertained to only one separation. The separation considered corresponds to mask 30 of FIG. 2. One of the important features of my invention that makes it especially adaptable to design of masks by means of a computer is the fact that the mask determinations for any of the separations proceeds in exactly the same way. That is, the same computer program can be used for separating any set of characters into subsets. Therefore, the development of masks 31,32,33, . . . is undertaken by following the same procedure as was used for mask 30, except of course that a different set of characters was considered as the input for each different mask.

Referring again to FIG. 2 the ranges of the relative frequencies chosen for developing each mask are indicated by the numbers alongside each mask. Notice that for this simplified case of a 3 × 5 alphabet many of the optimum levels correspond to a single number. For each mask the value of the chosen relative frequency range is the number or numbers shown beside each mask divided by the number of characters considered by each mask.

One additional modification can be made to increase the effectiveness of a mask. Once a mask has been developed, if it is found that it does not present sufficient separation between subsets, it is sometimes possible to improve the effectiveness of a mask by removing some of the transparent areas. An example of this type of modification is shown in mask 34 of FIG. 2. A mask for a relative frequency of squares of 2 out of 3 should include the two crosshatched areas marked 114. However, if these areas were transparent the similarities would be 60 percent, 60 percent, and 80 percent for "2, 4, and 7" respectively. By determining that the two sets of two squares are common to two characters each, it can be shown that eliminating one of these sets from the transparent portions of the mask changes the relative frequencies to 33 percent, 66 percent, and 100 percent for "2, 7, and 4" respectively.

All the mask developments described herein have considered only a two-state mask. Each portion of the area of a mask was defined as being either transparent or opaque. Certainly modifications could be made within the scope of this patent to define masks with various degrees of transparency at various positions on the mask. These shades of grey can be defined in terms of the relative frequencies of occurrence of information in a certain subdivision on the field of a pattern in much the same manner as is described for the clear and opaque masks. Practical considerations dictated by the use of a binary state computer cause the development of shaded masks to be more consuming of computer time, thus two-state clear and opaque masks have been investigated more fully in the development of this patent.

For practical application of this invention with a digital computer used for the design of the masks, the output of the computer can be a photograph made of the face of a cathode-ray-tube computer output. Such a cathode-ray-tube output is now in standard use with large scale digital computers. The photograph of the cathode-ray-tube can then be used directly to serve as the masks of FIG. 2. The other significant computer outputs for the weighted-area pattern recognition machine would be the threshold levels pertaining to each of the masks and the configuration of the logical tree structure of the recognition process.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. Apparatus for automatic pattern recognition, comprising first means for determining, as to any particular pattern of a set of patterns, the membership of the particular pattern in one or more of at least two plural-pattern subsets of said set of patterns, in accordance with whether the particular pattern exceeds a predetermined threshold of similarity to a predetermined standard associated with said set, second and third means associated with said subsets, respectively, for determining the membership of the particular pattern in one or more of at least two plural-pattern portions of each plural-pattern subset of which the particular pattern is a member, in accordance with whether the particular pattern exceeds a predetermined threshold of similarity to predetermined standards associated with such subsets, respectively, and additional means associated with said plural-pattern portions, respectively, for determining the membership of the particular pattern in at least two subportions of each plural-pattern portion of which the particular pattern is a member, in accordance with whether the particular pattern exceeds a predetermined threshold of similarity to predetermined standards associated with such portions, respectively, each determining means having means for making the associated determination in accordance with whether a predetermined weighted sum of a plurality of elemental pattern areas exceeds the associated threshold.

2. Apparatus in accordance with claim 1, wherein at least some of said subportions comprise a single pattern from said set.

3. Apparatus in accordance with claim 1, wherein said determining means have means for applying a signal thereto corresponding to said particular pattern, and wherein each of said determining means has means for producing a predetermined output when the pattern corresponding to the signal applied thereto exceeds the said threshold of similarity to the associated standard.

4. Apparatus in accordance with claim 3, wherein at least some of said determining means include means for producing said predetermined output indicative of membership in more than one associated subset, portion, or subportion when the pattern corresponding to the signal applied thereto is within a predetermined degree of similarity tolerance band.

5. Apparatus in accordance with claim 3, further comprising means for applying a signal corresponding to any particular pattern sequentially to said determining means, means for producing outputs from at least some of said determining means sequentially, depending upon the identification of the particular pattern, and means for indicating said outputs concurrently.

6. Apparatus in accordance with claim 3, wherein each of said determining means comprises a unique signal-modifying mask positioned to receive signals corresponding to said patterns and having a sensor for receiving signals modified by the associated mask, each mask having means for producing a predetermined modification of the signal applied thereto depending upon the degree of similarity of the corresponding pattern to the standard associated with that mask.

7. Apparatus in accordance with claim 6, wherein said masks are optical masks with opaque and light-transmitting portions, wherein said signals are light beams and said sensors are photosensitive, and wherein each sensor is connected to the input of an associated threshold circuit.

8. Apparatus in accordance with claim 7, wherein each mask has a unique arrangement of statistically weighted areas in accordance with the patterns which produce said predetermined output from the associated determining means.

9. Apparatus in accordance with claim 3, further comprising means for producing a parallel binary word indication in response to individual outputs from said determining means.

10. A method of automatic pattern recognition, comprising determining, as to any particular pattern of a set of patterns, the membership of the particular pattern in one or more of at least two plural-pattern subsets of said set of patterns, in accordance with whether the particular pattern exceeds a predetermined threshold of similarity to a predetermined standard associated with said set, determining the membership of the particular pattern in one or more of at least two pluralpattern portions of each plural-pattern subset of which the particular pattern is a member, in accordance with whether the particular pattern exceeds a predetermined threshold of similarity to predetermined standards associated with such subsets, respectively, determining the membership of the particular pattern in at least two subportions of each plural-pattern portion of which the particular pattern is a member, in accordance with whether the particular pattern exceeds a predetermined threshold of similarity to predetermined standards associated with such portions, respectively, said standards and thresholds being established by analyzing the patterns of the associated set, subset, or portion, each determining step comprising producing an output signal depending upon whether a predetermined weighted sum of a plurality of elemental pattern areas exceeds the associated threshold, and producing unique responses representing said patterns from groups of said output signals.

11. A method in accordance with claim 10, wherein at least some of said subportions comprise a single pattern from said set.

12. A method in accordance with claim 10, wherein said determining steps comprise applying to determining means an input signal corresponding to said particular pattern and producing a predetermined signal output from the determining means when the pattern corresponding to the signal applied thereto exceeds the said threshold of similarity to the associated standard.

13. A method in accordance with claim 12, wherein at least some of said determining steps include producing said predetermined output signal, indicative of membership in more than one associated subset,portion, or subportion, when the pattern corresponding to the input signal applied thereto is within a predetermined degree of similarity tolerance band.

14. A method in accordance with claim 12, wherein an input signal corresponding to any particular pattern is applied sequentially to said determining means, and output signals from at least some of said determining means are produced sequentially, depending upon the identification of the particular pattern, and wherein said responses are produced by indicating said output signals concurrently.

15. A method in accordance with claim 12, each response comprising a parallel binary word indication.

16. A method of producing apparatus for recognizing patterns of a set automatically, which comprises producing a first pattern recognition means which separates said patterns into two or more plural-pattern subsets depending upon the degree of similarity of any particular pattern to a standard associated with the set, producing for each of said plural-pattern subsets a pattern recognition means which separates the patterns of that subset into two or more plural-pattern portions depending upon the degree of similarity of the patterns of said portions to standards associated with said subsets, respectively, and producing for each of said plural-pattern portions a pattern recognition means which separates the patterns of that portion into two or more subportions depending upon the degree of similarity of the patterns of said subportions to standards associated with said portions, respectively, the pattern-separating criterion of each recognition means depending upon whether a predetermined weighted sum of a plurality of elemental pattern areas exceeds an associated threshold of similarity to the associated standard.

17. A method in accordance with claim 16, further comprising selecting said standards for certain of the associated recognition means so that certain patterns separated thereby are members of a plurality of subsets or portions thereof.

18. A method in accordance with claim 17, wherein each of said certain recognition means is produced so as to include a degree of similarity acceptance band containing the degree of similarity of said certain patterns to the standards associated with said certain recognition means.

19. A method in accordance with claim 18, wherein said acceptance band has predetermined width and is located so that the number of said certain patterns is minimized.

20. A method in accordance with claim 16, wherein the producing of each of said pattern recognition means comprises analyzing the patterns to be separated thereby to determine the frequency of occurrence of elements of the same at a plurality of predetermined areas and establishing the associated standard to include selected areas considered in the analysis.

21. A method in accordance with claim 20, wherein the selected areas are areas in which the frequency of occurrence of elements of the patterns analyzed is a value intermediate and different from the maximum and minimum frequencies determined by said analyzing.

22. A method in accordance with claim 21, in which most of the selected areas correspond to frequencies greater than 5 out of 10.

23. A method in accordance with claim 16, in which the degree of similarity to the standard for any of said pattern recognition means which determines whether a pattern is separated into one subset or portion or another subset or portion is at least of the order of 50 percent and less than of the order of 90 percent.

24. A method of producing apparatus for recognizing patterns of a set automatically, which comprises analyzing said patterns to determine the frequency of occurrence of elements of said patterns at each of a plurality of predetermined areas of said patterns, producing a mask having distinctive areas corresponding to certain of the first-mentioned areas at which said frequency is at least of the order of 5 out of 10, the distinctive areas of said mask being selected so that each of the patterns of a first plural-pattern subset has a totality of elements corresponding to distinctive areas of said mask which is greater than a threshold of similarity to the sum of said distinctive areas and each of the patterns of a second plural-pattern subset has a totality of such elements which is less than or equal to said threshold, whereby said set is separated into at least two subsets, analyzing the patterns of each of said subsets in the same manner and producing masks in accordance with the last-mentioned analyzing in the same manner so as to separate each subset into at least two portions.

25. A method in accordance with claim 24, wherein said distinctive areas of said mask correspond to areas of said patterns at which said frequency is no greater than of the order of 9 out of 10.

26. A method in accordance with claim 24, wherein the analyzing and mask-producing steps are continued until masks are produced which separate said patterns uniquely.

27. A method in accordance with claim 24, further comprising analyzing the patterns of each of said portions containing plural-patterns in the same manner and producing masks in accordance with the last-mentioned analyzing in the same manner so as to separate each such portion into at least two subportions.

28. A method of automatic pattern recognition, comprising analyzing the patterns of a set to determine the frequency of occurrence of elements of said patterns at each of a plurality of predetermined areas of said patterns, producing a pattern recognition means having distinctive areas corresponding to certain of the first-mentioned areas, the distinctive areas of said pattern recognition means being selected so that each of the patterns of a first subset has a totality of elements corresponding to distinctive areas of said pattern recognition means which is greater than a threshold of similarity to the sum of said distinctive areas and each of the patterns of a second subset has a totality of such elements which is less than or equal to said threshold, at least one of said subsets containing plural-patterns, whereby said set is separated into at least two subsets, analyzing the patterns of each of the plural-pattern subsets in the same manner and producing pattern recognition means in accordance with each of the last-mentioned analyzing in the same manner so as to separate each plural-pattern subset into at least two portions, and utilizing the pattern recognition means for determining, as to any particular pattern of said set of patterns, the membership of the particular pattern in one or more of the subsets and portions depending upon whether the sum of a plurality of elemental pattern areas exceeds the thresholds of similarity associated with the respective pattern recognition means.

* * * * *